United States Patent [19]

Ito

[11] Patent Number: 5,018,603
[45] Date of Patent: May 28, 1991

[54] ELEVATOR HOIST APPARATUS

[75] Inventor: Hiroyasu Ito, Inazawa, Japan

[73] Assignee: Mitsubishi Denki Kabushiki Kaisha, Japan

[21] Appl. No.: 397,845

[22] Filed: Aug. 24, 1989

[30] Foreign Application Priority Data

Aug. 26, 1988 [JP] Japan .................. 63-212213

[51] Int. Cl.$^5$ ............................................ B66B 11/08
[52] U.S. Cl. .......................................... 187/17; 187/20; 254/362; 254/378
[58] Field of Search .................. 187/17, 20, 27, 108, 187/115, 131; 254/362, 378, 901; 310/12, 14, 89, 267

[56] References Cited

U.S. PATENT DOCUMENTS

| 1,171,964 | 2/1916 | Lindstrom | 254/378 X |
| 4,526,252 | 7/1985 | Hirano | 187/20 |
| 4,600,086 | 7/1986 | Yamasaki et al. | 187/27 |
| 4,829,208 | 5/1989 | Uchino | 310/89 X |

FOREIGN PATENT DOCUMENTS

| 52-32870 | 8/1975 | Japan . |
| 59-118686 | 7/1984 | Japan . |
| 60-102890 | 7/1985 | Japan . |
| 60-128853 | 9/1985 | Japan . |
| 61-217486 | 9/1986 | Japan . |

Primary Examiner—Robert P. Olszewski
Assistant Examiner—Dean A. Reichard
Attorney, Agent, or Firm—Leydig, Voit & Mayer

[57] ABSTRACT

A hoist apparatus comprising a stationary shaft supported by a support, and a sheave having a cavity with a side opening detachably, and rotatably, mounted on the shaft. A motor stator assembly is mounted on the support member and extends into the inner space through the side opening, and a motor rotor assembly is disposed within the inner space in an electromagnetically inductive relationship with the motor stator assembly. The motor rotor assembly is detachably connected to the sheave by a connecting assembly including a bolt fastening the motor rotor assembly to the sheave.

17 Claims, 5 Drawing Sheets

ELEVATOR HOIST APPARATUS

BACKGROUND OF THE INVENTION

This invention relates to a hoist apparatus and more particularly to an elevator gearless hoist apparatus.

Figure 1:
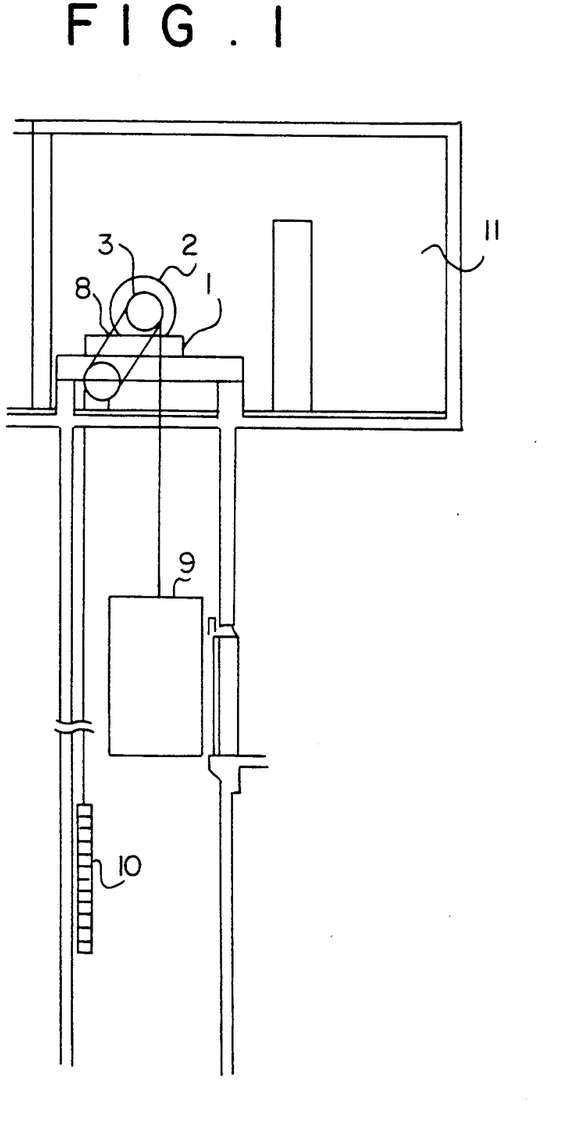
FIG. 1 is a schematic view showing an elevator system in which the elevator hoist apparatus of the present invention can be employed.

FIG. 1 illustrates a general structure of an elevator system with a hoist apparatus, in which reference numeral 8 designates main rope, 9 an elevator car, 10 a counter weight, 2 an electric motor and 3 designates a sheave. The electric motor 2 and the sheave 3 are securely mounted on a base 1 which in turn is installed in machine room 11. The elevator car 9 and the counter weight 10 are connected through the main rope 8 wound around the sheave 3, so that when the sheave 3 is rotated by the motor 2, the main rope 8 is driven to move the elevator car 9 along the hoistway.

Figure 2:
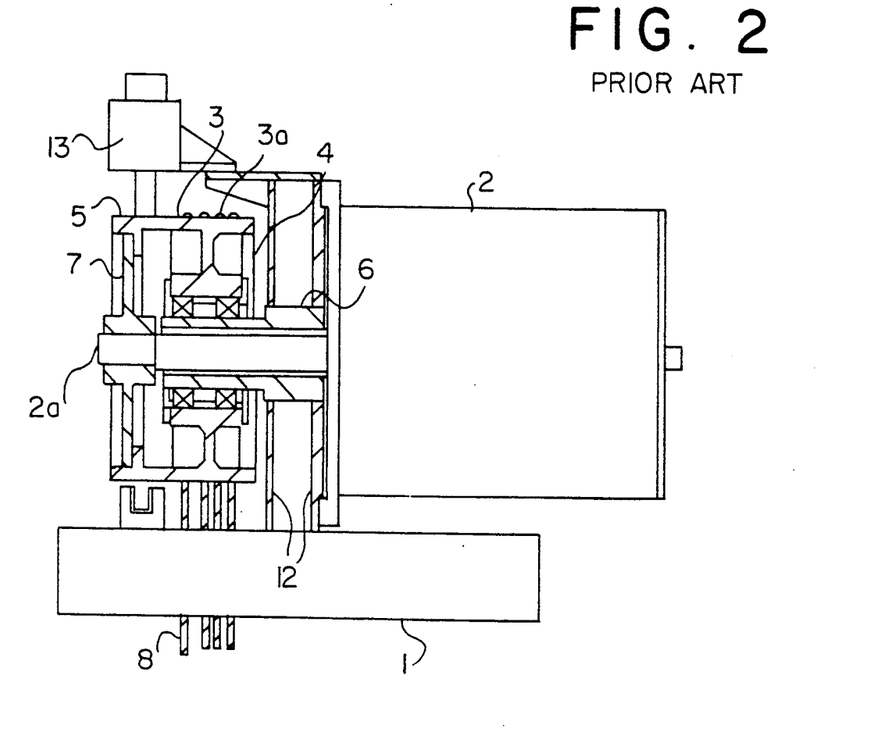
FIG. 2 is a sectional view illustrating one example of a conventional elevator hoist apparatus.

One example of the structure of a gearless elevator hoist apparatus comprising the electric motor 2 and the sheave 3 as disclosed in Japanese Patent Laid-Open No. 61-217486 is illustrated in FIG. 2. In FIG. 2, the base 1 is secured in the machine room 11 and the electric motor 2 is mounted on a pedestal or a support bracket 12 mounted to the base 1. Reference numeral 2a designates a rotary shaft of the electric motor 2, 6 is a hollow tubular shaft secured to the support bracket 12. The sheave 3 having rope grooves 3a around it for receiving the main ropes 8 therein is rotatably mounted on the hollow shaft 6 through a bearing 4. On the other hand, the sheave 3 is fixedly mounted on the motor rotary shaft 2a through a connecting plate 7. An electromagnetic brake unit 13 is mounted on the support bracket 12 so that its shoes are pressed against a brake drum 5 integrally formed on the sheave 3.

The rotation of the rotary shaft 2a of the electric motor 2 causes the sheave 3 to rotate through the connecting plate 7, whereby the main ropes 8 are driven to move the elevator car 9. The load on the sheave 3 is transmitted through the bearing 4 to the hollow shaft 6, and the load on the hollow shaft 6 is supported by the support bracket 12 and the base 1.

In the elevator hoist apparatus as above described, the sheave 3 is disposed in an axially aligned relationship with respect to the rotary shaft 2a of the electric motor 2, so that the axial dimension of the hoist apparatus is relatively large, imposing a dimensional limitation when the hoist apparatus is to be installed in the machine room 11. In order to meet this dimensional limitation, the axial dimension is decreased by increasing the radial dimensions of the electric motor 2 and the sheave 3. With this arrangement, since the diameter of the sheave is large, the connecting plate 7 as well as the hollow shaft 6 for transmitting the rotational force and supporting the load become large, thereby disadvantageously increasing the weight of the apparatus.

Figure 3:
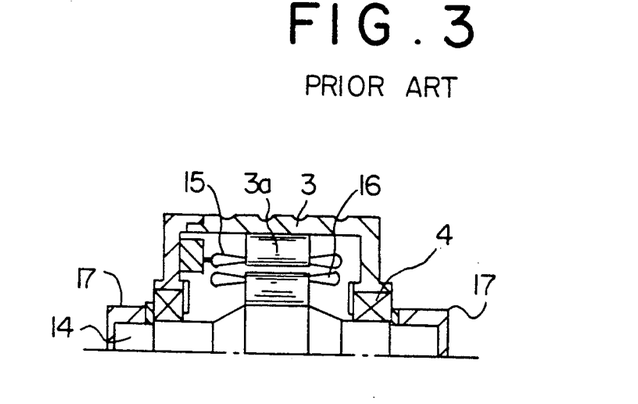
FIG. 3 is a sectional view illustrating another example of a conventional elevator hoist apparatus.

FIG. 3 illustrates one example of a hoist apparatus disclosed in Japanese Utility Model Laid-Open No. 52-32870 and proposed to overcome the above-discussed problems. In FIG. 3, the hoist apparatus comprises a stationary shaft 14 supported at opposite ends by a pair of support stands 17. The stationary shaft 14 securely supports thereon a motor stator assembly 16 including a stator iron core and a stator coil. The stationary shaft 14 rotatably supports a sheave 3 with rope grooves 3a through a pair of bearings 4. The sheave 3 has a substantially drum-shaped configuration having a substantially U-shaped cross section. A motor rotor assembly 15 including a rotor core and a rotor coil is firmly attached to the inner circumferential surface of the sheave 3. In this context, the sheave 3 also functions as a motor frame for supporting the motor rotor assembly 15.

In this hoist apparatus, the motor frame and the sheave are combined into a single common member, so that the axial length of the hoist apparatus is much shorter than that shown in FIG. 2, realizing a lightweight hoist apparatus. However, while the motor frame and the sheave are combined in this hoist apparatus, the opposite ends of the sheave 3 are supported through the pair of the bearings 4 on the stationary shaft 14 and this shaft 14 is supported at the portions outside of the bearings 4 by the support stands 17, so that the overall axial length of the hoist apparatus is still relatively long.

Generally, the operating life of the sheave significantly decreases as the diameter of the sheave is decreased due to the frictional wear between the rope grooves of the sheave and the main ropes. When a worn sheave is to be replaced with a new one, the firmly assembled sheave itself must be disassembled and then the motor rotor assembly and the motor stator assembly must also be dismounted from the sheave and the shaft, respectively, causing the exchange of the sheave to be very difficult. Accordingly, it has been practiced that the sheave is designed to have an operating life three or four times longer than that of the main rope, thus decreasing the frequency of the need for the sheave exchange. However, with a small-diameter sheave, the wear of the sheave and the main rope is larger, so that a special material must be selected for the sheave, which makes the sheave expensive and a severer load is applied to the main rope, further shortening the life of the main rope and increasing the need for frequent maintenance.

SUMMARY OF THE INVENTION

Accordingly, one object of the present invention is to provide a hoist apparatus free from the above-discussed problems of the conventional hoist apparatus.

Another object of the present invention is to provide a hoist apparatus which has a short axial dimension.

Another object of the present invention is to provide a hoist apparatus which has a short axial dimension but may have a relatively large sheave diameter.

Still another object of the present invention is to provide a hoist apparatus which is easy in repair and maintenance.

Still another object of the present invention is to provide a hoist apparatus which has a long lifetime and is reliable.

With the above objects in view, a hoist apparatus of the present invention comprises a stationary shaft supported by a support, and a sheave, having a cavity with a side opening is detachably and rotatably mounted on the shaft. A motor stator assembly is mounted on the support member and extends into the inner space through the side opening, and a motor rotor assembly is disposed within the inner space in an electromagnetically inductive relationship with the motor stator assembly. The motor rotor assembly is detachably connected to the sheave by a connecting assembly which may include a bolt fastening the motor rotor assembly to the sheave.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 4:
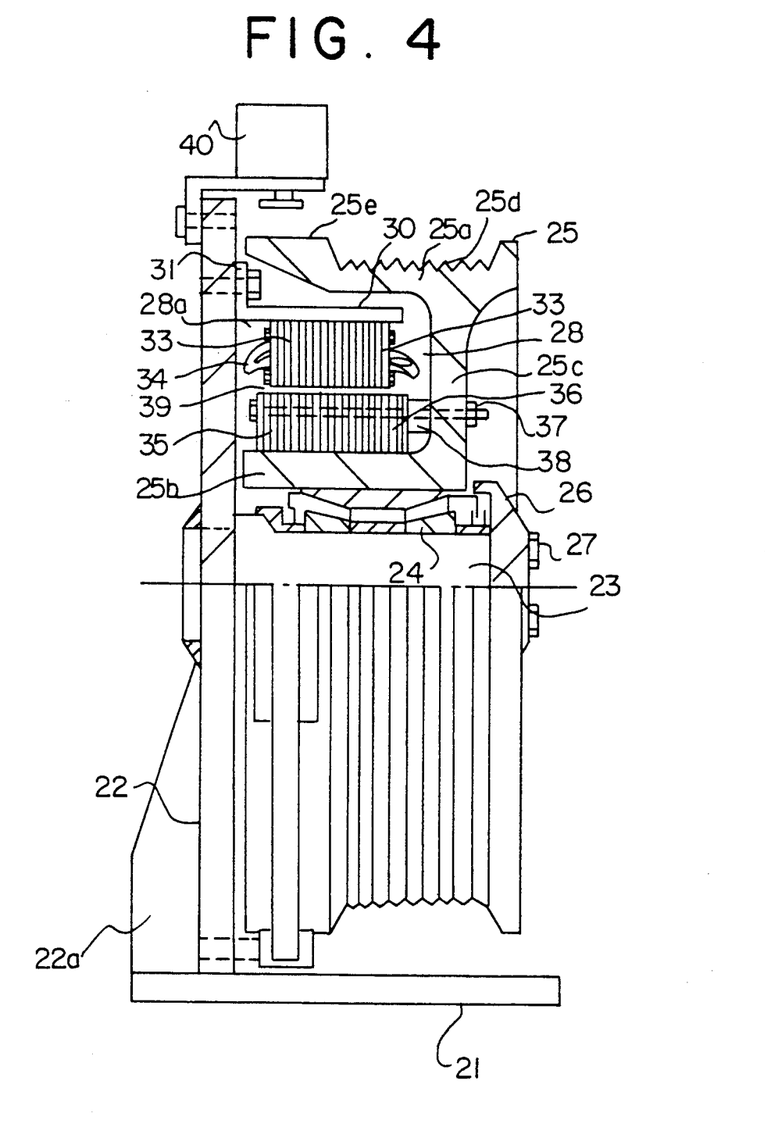
FIG. 4 is a sectional side view of one embodiment of the elevator hoist apparatus of the present invention.

FIG. 4 is a sectional side view of one embodiment of the elevator hoist apparatus of the present invention. The elevator hoist apparatus comprises a base 21 securely connectable to the machine room 11 (FIG. 1) and a support member or a support bracket 22 upstanding from the base 21. The support bracket 22 is reinforced by braces 22a. The support bracket 22 securely supports one end of a stationary shaft 23 so that the shaft 23 extends in a horizontal direction. A roller bearing 24 is slide-fitted over the shaft 23 and a substantially drum-shaped sheave 25 is fitted over the bearing 24 so that it is rotatable on the shaft 23. In order to prevent the bearing 24 from being dislodged from the shaft 23, a stopper 26 is secured at the free end of the shaft 23 by bolts 27. The bearing 24 can be easily dismounted from the shaft 23 by detaching the stopper plate 26 from the end face of the shaft 23. Accordingly, the sheave 25 is detachably and rotatably mounted on the shaft 23.

The sheave 25 has a substantially drum-shaped configuration having an outer cylindrical wall 25a, an inner cylindrical wall or a hub 25b and a disc wall 25c connected between the outer and the inner cylindrical walls 25a and 25b. It is seen that the cylindrical walls 25a and 25b and the disc wall 25c together define therein an inner space 28 which sidewardly opens through a side opening 28a. The outer cylindrical wall 25a has formed on its outer circumference a plurality of rope grooves 25d as well as a brake drum 25e. The hub 25b is fitted over the outer race of the bearing 24.

The elevator hoist apparatus also comprises a motor stator assembly 30 firmly mounted to the support member 22 and extending, through the side opening 28a, into and disposed within the inner space 28 defined within the sheave 25. The motor stator assembly 30 comprises a support structure 31 attached to the support bracket 22 by bolts 32 (not labelled in FIG. 4) stator core 33 attached to the support structure 31 and the stator coil 34 wound around the stator core 33.

The elevator hoist apparatus further comprises a motor rotor assembly 35 disposed within the inner space 28 in an electromagnetically inductive relationship with the motor stator assembly 30. In the illustrated embodiment, the motor rotor assembly 35 comprises a rotor core 36 made of a stack of laminations and a rotor coil (not shown in FIG. 4) wound around the core 36. The motor rotor assembly 35 is detachably connected to the sheave 25 by a connecting arrangement including bolts 37 and a spacer 38. The bolts 37 extend through the rotor core 36, the spacer 38 and through the disc plate 25c of the sheave 25 to assemble the components and securely connect the assembly to the sheave 25. Thus, the motor rotor assembly 35 and the motor stator assembly 30 are arranged in a radial direction with an air gap 39 defined therebetween.

The elevator hoist apparatus further comprises an electromagnetic brake unit 40 mounted to the support bracket 22 so that a braking force can be applied against the brake drum 25e of the sheave 25.

When the motor stator assembly 30 is energized, a rotational torque is generated in the motor rotor assembly 35 and is transmitted to the sheave 25 through the hub 25b and the bolts 37 to drive the sheave 25, whereby the main ropes 8 (see FIG. 1) wound around the rope grooves 25d on the sheave 25 are driven. The sheave 25 rotates about the stationary shaft 23 via the bearing 24, which is held in its position by the stopper plate 26.

According to the elevator hoist apparatus as above described, the motor stator assembly 30 and the motor rotor assembly 35 are disposed within an inner space 28 or a cavity within the sheave 25, the bearing 24 is centrally disposed between the shaft 23 and the hub 25b of the sheave 25, and the electromagnetic brake unit 40 is mounted on the support bracket 22, so that the axial dimension of the elevator hoist apparatus can be significantly decreased. Also, since the rotational torque generated by the electric motor can be directly transmitted to the sheave 25, the structure can be made simple and light-weight.

Since the bearing 24 is slide-fitted over the shaft 23, the sheave 25 can be easily dismounted and again mounted relative to the stationary shaft 23 by detaching and attaching the stopper plate 26 with respect to the shaft 23. Also, since the bearing 24 is centrally disposed the aligning of the components can be precisely achieved.

Further, since the spacer 38 is provided in the motor rotor assembly 35, jack bolts which extend from the sheave 25 and thread-engaged only into the spacer 38 can be employed for a more easy assembly and disassembly. Also, the bearing 24 is attached to the shaft 23 by a small tightening, so that the assembly and the disassembly of the bearing can also be easily achieved.

As has been described above, since the structure of the hoist apparatus is easy to assemble and disassemble, it is not necessary to use a special material for the sheave in order to provide a life to the sheave three or four times longer than that of the main ropes which makes the life of the main ropes further shorter. Therefore, the main ropes and the sheave can be made to have approximately equal life, the most suitable material can be selected and the overall life can be increased. The management of the operating life of the components can be made easy and a reliable elevator hoist apparatus can be obtained. The material cost can also be decreased.

Figure 5:
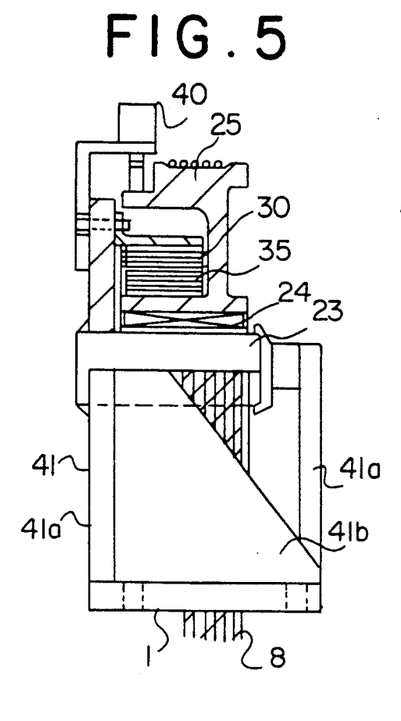
FIG. 5 is a sectional side view of another embodiment of the elevator hoist apparatus of the present invention.

FIG. 5 is a sectional side view of another embodiment of the elevator hoist apparatus of the present invention, in which the support structure 41 comprises a pair of support brackets 41a for supporting the opposite ends of the stationary shaft 23 and a larger reinforcing brace 41b. This embodiment is useful when the hoist apparatus is used with a heavy load.

Figure 6:
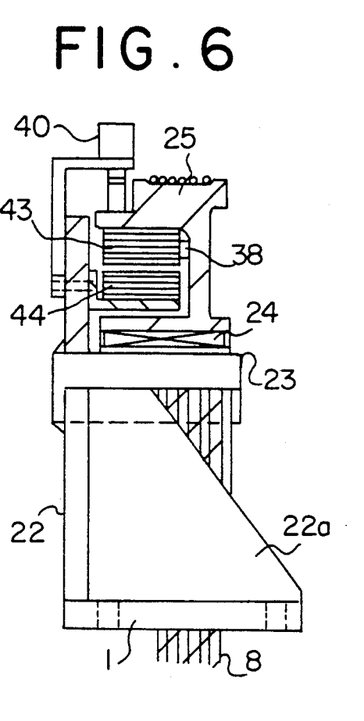
FIG. 6 is a sectional side view of a still another embodiment of the elevator hoist apparatus of the present invention.

FIG. 6 is a sectional side view of a still another embodiment of the elevator hoist apparatus of the present invention, in which a motor rotor assembly 43 is attached to the sheave 25 with its radially outer surface brought in engagement with the radially inner surface of the outer cylindrical wall of the sheave 25. A motor stator assembly 44 is attached to the support bracket 22 with its pole face directed into the radially outward direction. With this embodiment the transmission of a larger rotational torque to the sheave 25 is made easier.

Figure 7:
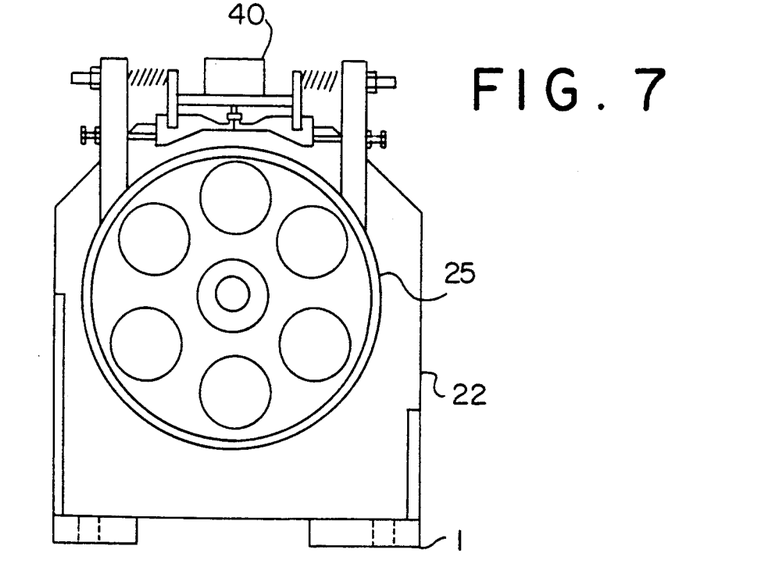
FIG. 7 is a front view of the elevator hoist apparatus of the present invention shown in FIG. 6.

FIG. 7 is a front view of the elevator hoist apparatus of the present invention shown in FIG. 6.

While the bolt 37 and the spacer 38 connected to the disc plate 25c of the sheave are used for detachably mounting the motor rotor assemblies 35 and 43 onto the sheave 25 in the above-described embodiments, a spacer may be inserted between the rotor assembly 35 and the hub 25b of the sheave 25. Alternatively, a key arrangement may be used for detachably connecting the rotor assembly 35 to the sheave.

Figure 8:
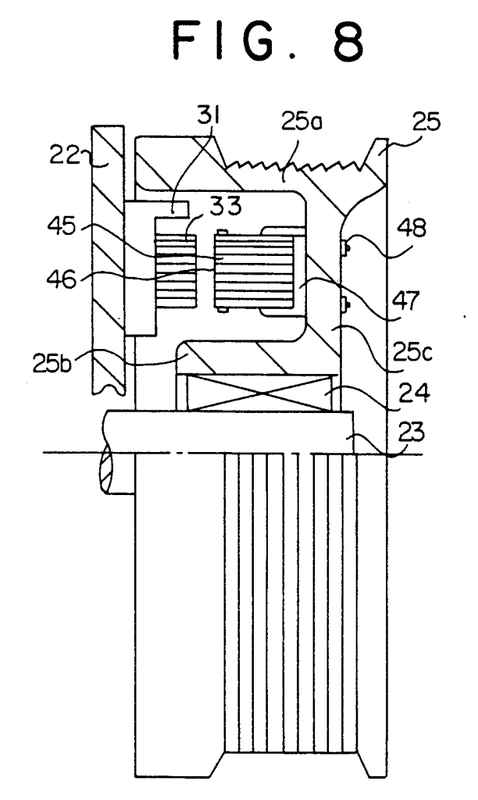
FIG. 8 is a sectional side view of the sheave and the motor rotor assembly of another hoist apparatus of the present invention.

FIG. 8 is a sectional side view of the sheave 25 and a motor rotor assembly 45 of another hoist apparatus of the present invention, in which the motor rotor assembly 45 includes a laminated iron core 46 and a frame structure 47 for supporting and connecting the assembly into one piece. The motor rotor assembly 45 thus constructed is connected to the disc plate 25c of the sheave 25 by jack bolts 48 extending through the sheave disc plate 25c and threaded into the frame structure 47 of the motor rotor assembly 45. The motor rotor assembly 45 has its magnetic pole face in the axial direction, so that the motor stator assembly mounted to the support bracket 22 is also directed in the axial direction to define an annular air gap therebetween although not illustrated. In this embodiment, since the motor rotor and the stator assemblies are arranged in the axial direction, the assembly and disassembly of the sheave can be more easily carried out. Also, the detachable connection between the motor rotor assembly 45 and the sheave 25 is realized by simple jack bolts 48 threaded only into the frame structure 47 of the assembly 45, the structure of the assembly as well as the mounting and dismounting operation of the rotor assembly with respect to the sheave can be simple and easy.

Figure 9:
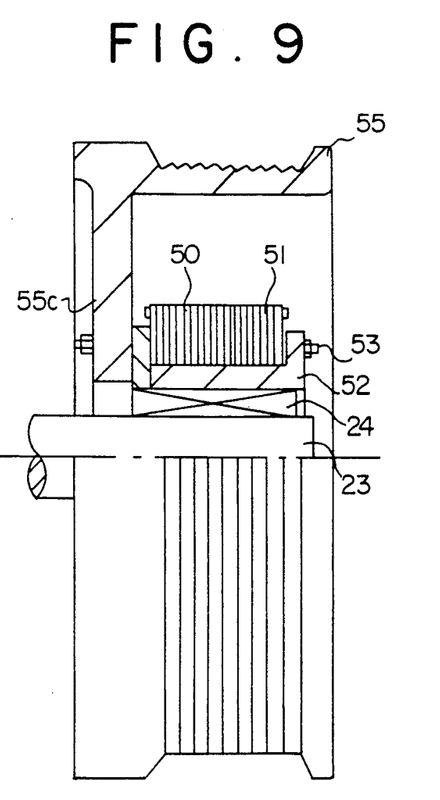
FIG. 9 is a sectional side view of the sheave and the motor rotor assembly of a still another hoist apparatus of the present invention.

FIG. 9 illustrates still another embodiment of the elevator hoist apparatus of the present invention, in which a motor rotor assembly 50 includes a laminated iron core 51 and a rigid frame structure 52 for supporting and connecting the assembly 50 including the laminations into one piece. The motor rotor assembly 50 has a magnetic pole face facing toward the radially outward direction, so that it is seen that the frame structure 52 is disposed radially inward of the core 51 and is detachably mounted by a bolt, 53 to a disc plate 55c of a sheave 55. In this embodiment, since the rigid frame structure 52 is disposed radially inside of the iron core 51, this frame structure 52 is utilized as the hub portion of the sheave 55. Therefore, the bearing 24 is disposed between the shaft 23 (not shown) and the frame structure 52. Since the sheave 55 has no hub portion, the structure and the manufacture of the sheave 55 can be much easier than the sheave with the hub portion, and the sheave 55 can be inexpensive.

As has been described, a hoist apparatus of the present invention comprises a stationary shaft supported by a support, and a sheave having a cavity with a side opening, that is detachably and rotatably mounted on the shaft. A motor stator assembly is mounted on the support member and extends into the inner space through the side opening, and a motor rotor assembly is disposed within the inner space in an electromagnetically inductive relationship with the motor stator assembly. The motor rotor assembly is detachably connected to the sheave by a connecting assembly which may include a bolt fastening the motor rotor assembly to the sheave. Therefore, the hoist apparatus has a short axial dimension but may have a relatively large sheave diameter, and is easy in repair and maintenance. The hoist apparatus also has a long lifetime and is reliable.

What is claimed is:

1. A hoist apparatus comprising:
   a shaft;
   a support member for supporting said shaft;
   a sheave detachably and rotatably mounted on said shaft, said sheave having walls including one disc side wall defining an inner space with a side opening opposite said side wall;
   a motor stator mounted to said support member via a support structure which extends into the inner space of said sheave through the side opening and carries said motor stator inside said sheave;
   a motor rotor core disposed with the inner space in an electromagnetically inductive relationship with said motor stator; and
   means for detachably mounting said motor rotor core to said disc side wall of said sheave and inside said sheave spaced by an air gap from said motor stator.

2. A hoist apparatus as claimed in claim 1, wherein said shaft is supported at one end by said support member.

3. A hoist apparatus as claimed in claim 1, wherein said shaft is supported at opposite ends by said support member.

4. A hoist apparatus as claimed in claim 1, wherein said shaft is supported at one end by said support member, and further comprising a bearing disposed between said shaft and said sheave so that said sheave is rotatable about said shaft, and a bearing stopper detachably mounted on the other end of said shaft.

5. A hoist apparatus as claimed in claim 1, further comprising a brake unit mounted on said support member and a brake drum mounted on said sheave for being engaged by said brake unit.

6. A hoist apparatus as claimed in 1, wherein said mounting means comprises a bolt fastening said motor rotor assembly directly to said disc side wall of said sheave.

7. A hoist apparatus as claimed in claim 1, wherein said motor rotor core and said motor stator are arranged in a radial direction with an air gap defined therebetween.

8. A hoist apparatus as claimed in claim 1, wherein said motor rotor and said motor stator are arranged in an axial direction with an air gap defined therebetween.

9. A hoist apparatus as claimed in claim 1 wherein said motor stator and said motor rotor core are disposed substantially completely within the inner space of said sheave.

10. A hoist apparatus as claimed in claim 9 further comprising a bearing disposed between said shaft and an inner cylindrical wall of said sheave.

11. A hoist apparatus as claimed in claim 9 wherein said motor rotor core and said motor stator are arranged radially with respect to said shaft and are spaced by a radial air gap.

12. A hoist apparatus as claimed in claim 9, wherein said motor rotor core and said motor stator are arranged axially with respect to said shaft and are spaced by an axial air gap.

13. An elevator hoist apparatus comprising:
a shaft;
a support member for supporting said shaft;
a sheave detachably and rotatably mounted on said shaft for use with an elevator hoist rope, said sheave having therein an inner space with a side opening;
said sheave having walls including one disc side wall defining an inner space of said sheave, said sheave having a side opening opposite said one side wall and facing said support member;
a motor stator mounted to said support member via a support structure which extends into the inner space of said sheave through the side opening, said stator assembly being disposed inside said sheave;
a motor rotor core disposed within the inner space in an electromagnetically inductive relationship with said motor stator; and
mounting means for detachably mounting said motor rotor core to said sheave disc side wall and inside said sheave spaced by an air gap from said motor stator.

14. A hoist apparatus comprising:
a shaft
a support member for supporting said shaft;
a sheave detachably and rotatably mounted on said shaft, said sheave having an inside inner space with a side opening;
a sheave disc side wall and a sheave outer cylindrical wall providing outer surfaces of the inner space of said sheave;
a motor stator mounted to said support member via a support structure which extends into the said inner space through the side opening;
a motor rotor core disposed within the inner space of said sheave in an electromagnetically inductive relationship with said motor stator;
a frame structure which is located radially inward of said rotor core and mounts said motor rotor core to said sheave;
mounting means for detachably mounting said frame structure and motor rotor core to said disc side wall of said sheave.

15. A hoist apparatus as claimed in claim 14, wherein said frame structure provides a hub for said sheave, said hub being supported by a bearing on said shaft.

16. A hoist apparatus as claimed in claim 14, wherein said shaft is supported at one end by said support member.

17. A hoist apparatus as claimed in claim 14, further comprising a brake unit mounted on said support member and a brake drum mounted on said sheave for engagement by said bake unit.

* * * * *

UNITED STATES PATENT AND TRADEMARK OFFICE
CERTIFICATE OF CORRECTION

PATENT NO. : 5,018,603

DATED : May 28, 1991

INVENTOR(S) : Hiroyasu Ito

It is certified that error appears in the above-identified patent and that said Letters Patent is hereby corrected as shown below:

Column 6, line 33, change "with" to --within--

Column 8, line 4, after "shaft" insert --;--

Signed and Sealed this

Thirteenth Day of October, 1992

*Attest:*

DOUGLAS B. COMER

*Attesting Officer*     Acting Commissioner of Patents and Trademarks